US012677106B1

(12) United States Patent
Ihlefeld et al.

(10) Patent No.: US 12,677,106 B1
(45) Date of Patent: Jul. 7, 2026

(54) STATISTICAL PROVISIONING OF PERCEPTUAL AUDIO CUES TO ENHANCE SPEECH

(71) Applicant: Meta Platforms Technologies, LLC, Menlo Park, CA (US)

(72) Inventors: Antje Ihlefeld, Redmond, WA (US); William Owen Brimijoin, II, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 532 days.

(21) Appl. No.: 17/836,743

(22) Filed: Jun. 9, 2022

(51) Int. Cl.

| | |
|---|---|
| ***H04S 7/00*** | (2006.01) |
| ***G10L 21/0208*** | (2013.01) |
| ***G10L 21/0232*** | (2013.01) |
| ***G10L 25/90*** | (2013.01) |
| ***H04R 3/04*** | (2006.01) |
| ***H04S 3/00*** | (2006.01) |

(52) U.S. Cl.
CPC .......... *H04S 7/303* (2013.01); *G10L 21/0232* (2013.01); *G10L 25/90* (2013.01); *H04R 3/04* (2013.01); *H04S 3/008* (2013.01); *G10L 2021/02082* (2013.01); *H04S 2400/01* (2013.01); *H04S 2400/11* (2013.01); *H04S 2400/15* (2013.01); *H04S 2420/01* (2013.01)

(58) Field of Classification Search
CPC ...... H04S 7/303; H04S 3/008; H04S 2400/01; H04S 2400/11; H04S 2400/15; H04S 2420/01; G10L 21/0232; G10L 2021/02082; H04R 3/04
USPC ....... 381/310, 309, 92, 122, 300, 71.6, 71.1; 704/208, 207, 206, 205, 503, 226, 233
See application file for complete search history.

(56) References Cited

U.S. PATENT DOCUMENTS

| | | | | |
|---|---|---|---|---|
| 3,857,104 | A * | 12/1974 | Sacks | H03G 9/02 327/558 |
| 2002/0007273 | A1 * | 1/2002 | Chen | G10L 19/02 704/229 |
| 2004/0088161 | A1 * | 5/2004 | Corrigan | G10L 13/047 704/211 |
| 2005/0084116 | A1 * | 4/2005 | Schulz | G01S 3/8083 381/91 |
| 2005/0096899 | A1 * | 5/2005 | Padhi | G10L 15/10 704/216 |
| 2007/0160217 | A1 * | 7/2007 | Chun | H04S 3/00 381/1 |

(Continued)

*Primary Examiner* — Vivian C Chin
*Assistant Examiner* — Con P Tran
(74) *Attorney, Agent, or Firm* — Greenberg Traurig LLP

(57) ABSTRACT

Methods, systems, and storage media for generating spatial audio are disclosed. Exemplary implementations may: receive audio data from a plurality of sources; for each source of the plurality of sources, calculate a pitch similarity for the audio data; for each source of the plurality of sources, calculate an interaural level difference based at least in part on an attenuation level and/or a dynamic range of interaural time differences of the audio data; for each source of the plurality of sources, determine background audio from the audio data; for each source of the plurality of sources, attenuate the background audio of the audio data; generate spatial audio based at least in part on the audio data and the background audio; and cause output of the audio data and the background audio through an audio source.

20 Claims, 9 Drawing Sheets

(56) References Cited

U.S. PATENT DOCUMENTS

| | | | | |
|---|---|---|---|---|
| 2008/0300702 | A1* | 12/2008 | Gomez | G10L 25/48 700/94 |
| 2010/0183158 | A1* | 7/2010 | Haykin | H04R 25/552 381/23.1 |
| 2014/0343933 | A1* | 11/2014 | Zhao | G10L 25/00 704/207 |
| 2015/0092965 | A1* | 4/2015 | Umminger | H04S 7/304 381/310 |
| 2017/0178635 | A1* | 6/2017 | Atti | G10L 19/022 |
| 2019/0251950 | A1* | 8/2019 | Bonada | G10L 13/033 |
| 2020/0336858 | A1* | 10/2020 | Brimijoin, II | H04S 7/304 |
| 2023/0070560 | A1* | 3/2023 | D'Orazio | H04R 1/086 |

* cited by examiner

STATISTICAL PROVISIONING OF PERCEPTUAL AUDIO CUES TO ENHANCE SPEECH

TECHNICAL FIELD

The present disclosure generally relates to generating spatial audio and more particularly to statistical provisioning of perceptual audio cues to enhance speech.

BACKGROUND

Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Users often experience artificial reality environments through devices such as head-mounted displays (HMDs) that provide visual and audible information to individual users to let the users experience the sights and sounds of the artificial reality environments.

Competing audio sources within artificial reality environments can make it difficult for users to understand target audio sources (e.g., speech from a particular other user within the artificial reality environment). This can lead to reduced speech intelligibility and/or increased user fatigue. Conventional approaches typically estimate a target source that a user is trying to understand and enhance the signal-to-noise ratio (SNR) (e.g., by increasing the target intensity and/or by reducing the background intensity).

BRIEF SUMMARY

The subject disclosure provides for systems and methods for generating spatial audio. A user is allowed to easily hear and understand target sound sources within artificial reality environments when there is background noise and/or multiple sound sources. For example, a user can have a conversation with a small group of other users via their respective avatars in a crowded room of an artificial reality environment. The user can shift focus to different individual speakers in the group and clearly hear despite appreciable background noise from the crowded room.

One aspect of the present disclosure relates to a method for generating spatial audio. The method may include receiving audio data from a plurality of sources. The method may include, for each source of the plurality of sources, calculating a pitch similarity for the audio data. The method may include, for each source of the plurality of sources, calculating an interaural level difference based at least in part on an attenuation level and/or a dynamic range of interaural time differences of the audio data. The method may include, for each source of the plurality of sources, determining background audio from the audio data. The method may include, for each source of the plurality of sources, attenuating the background audio of the audio data. The method may include generating spatial audio based at least in part on the audio data and the background audio. The method may include causing output of the audio data and the background audio through an audio source.

Another aspect of the present disclosure relates to a system configured for generating spatial audio. The system may include one or more hardware processors configured by machine-readable instructions. The processor(s) may be configured to receive audio data from a plurality of sources. The plurality of sources may include representations of different entities within an artificial reality environment. The processor(s) may be configured to, for each source of the plurality of sources, calculate a pitch similarity for the audio data. Calculating the pitch similarity may include filtering the audio data between 200 Hz and 2500 Hz. The processor(s) may be configured to, for each source of the plurality of sources, calculate an interaural level difference based at least in part on an attenuation level and/or a dynamic range of interaural time differences of the audio data. The processor(s) may be configured to, for each source of the plurality of sources, determine background audio from the audio data. The background audio may include audio from an artificial reality environment that can be perceived in a vicinity of a user's avatar. Determining the background audio from the audio data may include isolating and/or removing target source audio from the audio data. The processor(s) may be configured to, for each source of the plurality of sources, attenuate the background audio of the audio data. The processor(s) may be configured to generate spatial audio based at least in part on the audio data and the background audio. The processor(s) may be configured to cause output of the audio data and the background audio through an audio source.

Yet another aspect of the present disclosure relates to a non-transient computer-readable storage medium having instructions embodied thereon, the instructions being executable by one or more processors to perform a method for generating spatial audio. The method may include receiving audio data from a plurality of sources. The plurality of sources may include representations of different entities within an artificial reality environment. The method may include, for each source of the plurality of sources, calculating a pitch similarity for the audio data. Calculating the pitch similarity may include filtering the audio data between 200 Hz and 2500 Hz. The method may include, for each source of the plurality of sources, calculating an interaural level difference based at least in part on an attenuation level and/or a dynamic range of interaural time differences of the audio data. The method may include, for each source of the plurality of sources, determining background audio from the audio data. The background audio may include audio from an artificial reality environment that can be perceived in a vicinity of a user's avatar. Determining the background audio from the audio data may include isolating and/or removing target source audio from the audio data. The method may include, for each source of the plurality of sources, attenuating the background audio of the audio data. The attenuating may include filtering the background audio into contiguous narrow bands. The method may include generating spatial audio based at least in part on the audio data and the background audio. The spatial audio may include virtual placement of sound sources anywhere in a three-dimensional space of an artificial reality environment. The method may include causing output of the audio data and the background audio through an audio source. The audio source through which the output is caused may include a head-mounted display device configured for artificial reality experiences.

Still another aspect of the present disclosure relates to a system configured for generating spatial audio. The system may include means for receiving audio data from a plurality of sources. The system may include means for, for each source of the plurality of sources, calculating a pitch similarity for the audio data. The system may include means for, for each source of the plurality of sources, calculating an interaural level difference based at least in part on an attenuation level and/or a dynamic range of interaural time differences of the audio data. The system may include means for, for each source of the plurality of sources, determining background audio from the audio data. The system may include means for, for each source of the plurality of sources, attenuating the background audio of the audio data. The system may include means for generating spatial audio based at least in part on the audio data and the background audio. The system may include means for causing output of the audio data and the background audio through an audio source.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
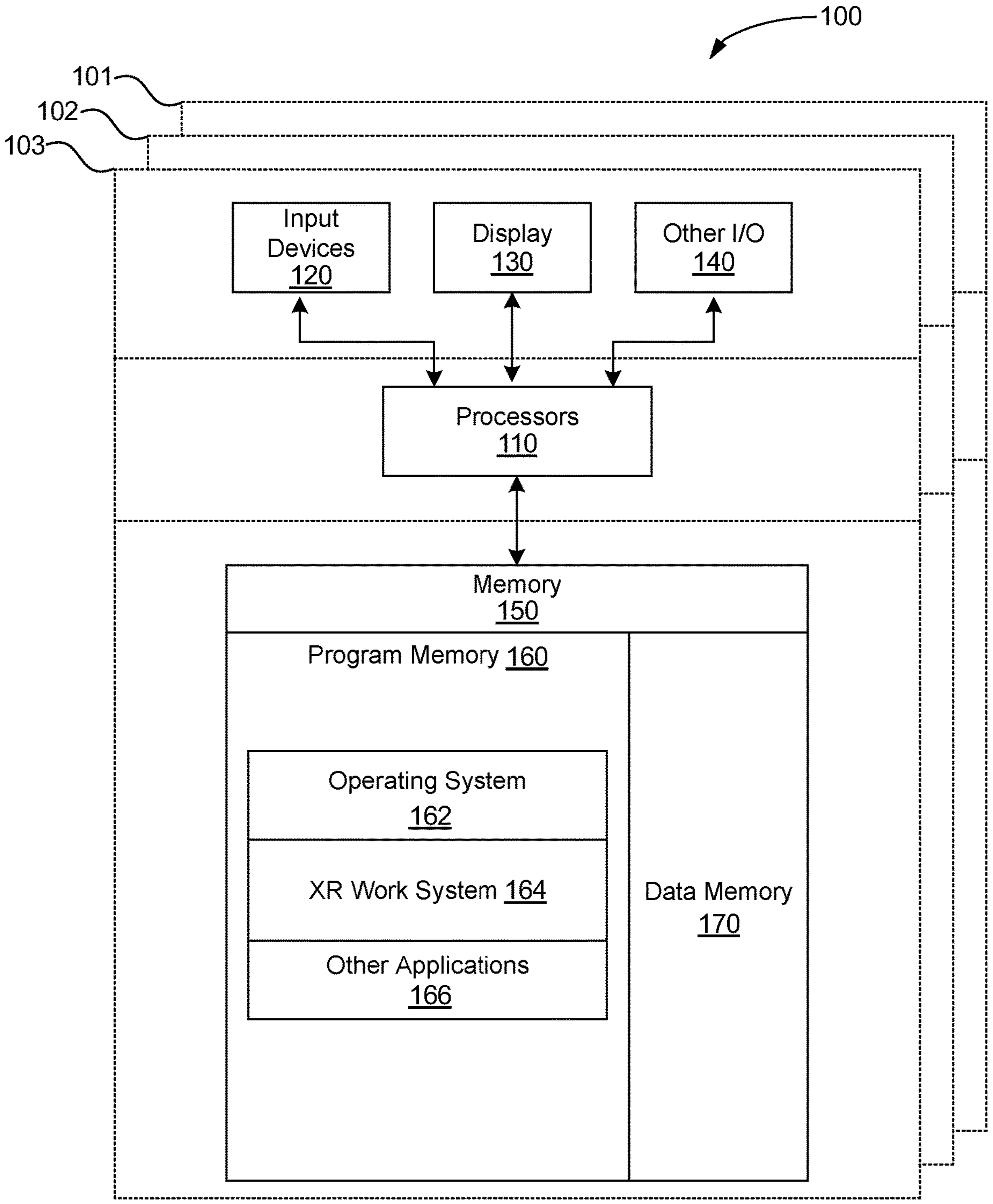
FIG. 1 is a block diagram illustrating an overview of devices on which some implementations of the disclosed technology can operate.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Enhancing the signal-to-noise ratio (SNR) for a target source in an artificial reality environment can increase the likelihood that energy from the target source swamps representation of background (or other) sources at the user's cochlea, making it difficult or impossible for the user's brain to retrieve information from the non-target sources. Therefore, the user cannot overhear background information. Moreover, the user's ability to switch attention across different sources in the environment is impaired. Furthermore, in situations where the wrong target source is identified, being locked in on a non-target source will frustrate the user. Other drawbacks of enhanced SNR for target sources may relate to prolonged exposure to loud sound causing hearing loss and/or battery consumption increasing with increasing target source intensity.

The subject disclosure provides for systems and methods for generating spatial audio. The subject disclosure provides for systems and methods for generating spatial audio. A user is allowed to easily hear and understand target sound sources within artificial reality environments when there is background noise and/or multiple sound sources. For example, a user can have a conversation with a small group of other users via their respective avatars in a crowded room of an artificial reality environment. The user can shift focus to different individual speakers in the group and clearly hear despite appreciable background noise from the crowded room.

Implementations described herein address the aforementioned shortcomings and other shortcomings by providing enhanced audio cues for target sources in artificial reality environments that do not appreciably alter SNR. For example, exemplary implementations may increase contrast between a target source and other sources by independently adjusting one or more perceptual cues including respatialization, whispered background, time-dilated vowels, enhanced sound onsets, and/or other perceptual cues.

Embodiments of the disclosed technology may include or be implemented in conjunction with an artificial reality system. Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR." as used herein, refers to an immersive experience where a user's visual input is controlled by a computing system. "Augmented reality" or "AR" refers to systems where a user views images of the real-world after they have passed through a computing system. For example, a tablet with a camera on the back can capture images of the real world and then display the images on the screen on the opposite side of the tablet from the camera. The tablet can process and adjust or "augment" the images as they passthrough the system, such as by adding virtual objects. "Mixed reality" or "MR" refers to systems where light entering a user's eye is partially generated by a computing system and partially composes light reflected off objects in the real world. For example, an MR headset could be shaped as a pair of glasses with a pass-through display, which allows light from the real-world to passthrough a waveguide that simultaneously emits light from a projector in the MR headset, allowing the MR headset to present virtual objects intermixed with the real objects the user can sec. "Artificial reality." "extra reality," or "XR," as used herein, refers to any of VR, AR, MR, or any combination or hybrid thereof.

Several implementations are discussed below in more detail in reference to the figures. FIG. 1 is a block diagram illustrating an overview of devices on which some implementations of the disclosed technology can operate. The devices can comprise hardware components of a computing system 100 that can create, administer, and provide interaction modes for an artificial reality collaborative working environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor (s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across one of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, XR work system 164, and other application programs 166. Memory 150 can also include data memory 170 that can include information to be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
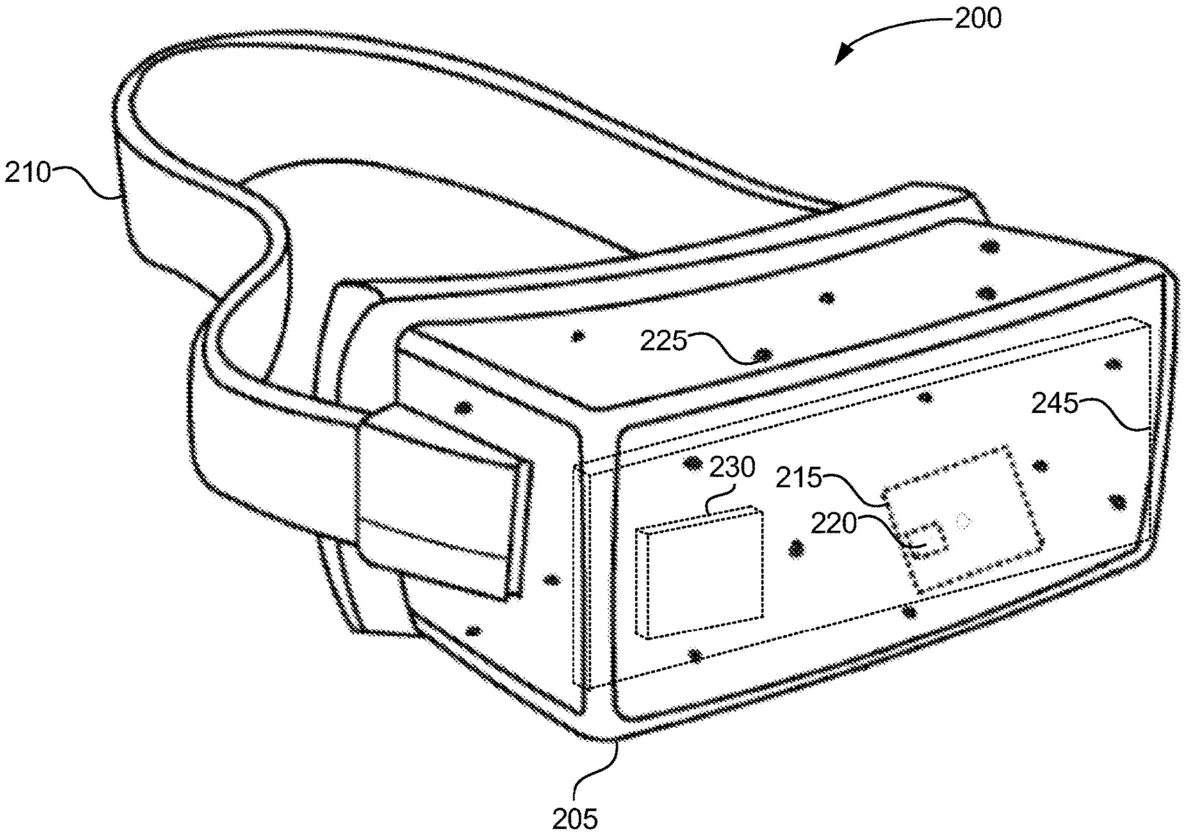
FIG. 2A is a wire diagram of a virtual reality head-mounted display (HMD), in accordance with one or more implementations.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3DoF) or six degrees of freedom (6DoF). For example, the locators 225 can emit infrared light beams which create light points on real objects around the HMD 200. As another example, the IMU 215 can include, e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
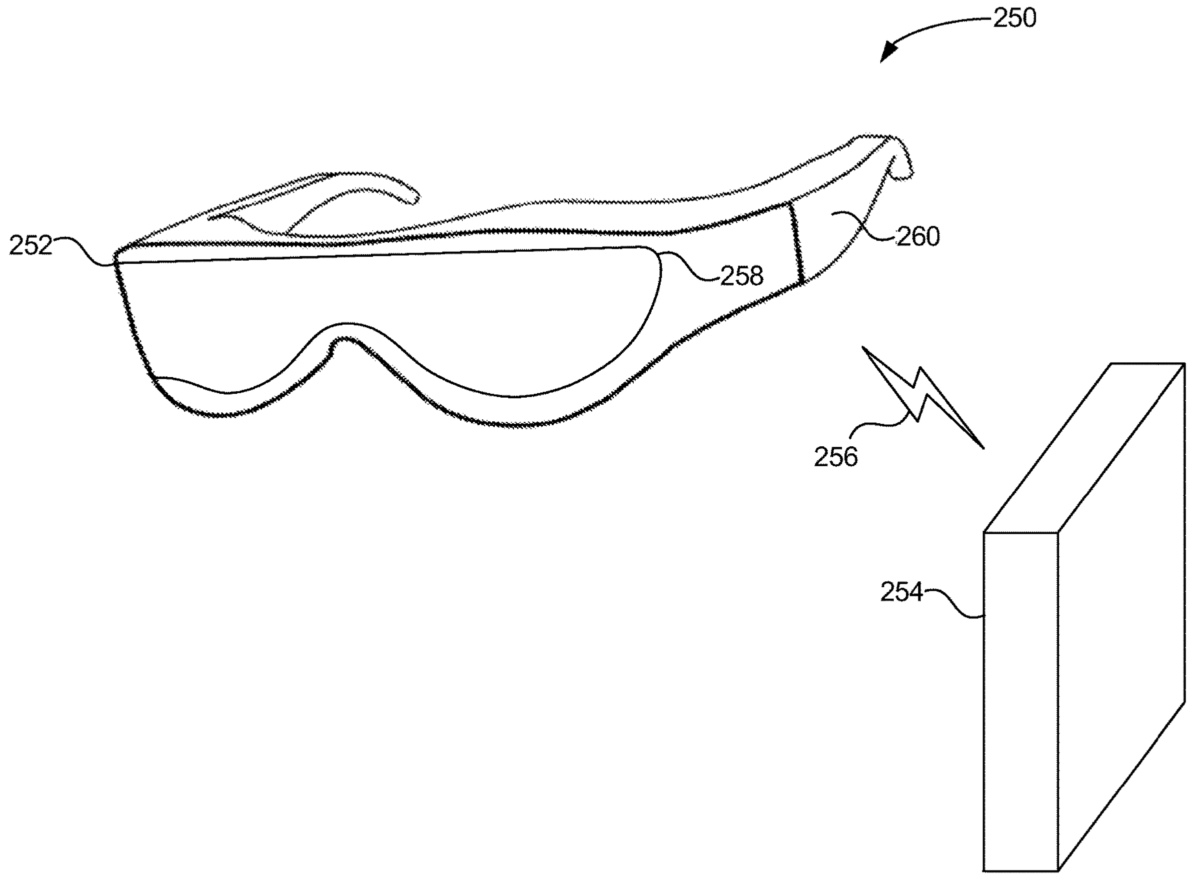
FIG. 2B is a wire diagram of a mixed reality HMD system which includes a mixed reality HMD and a core processing component, in accordance with one or more implementations.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERS, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 3A:
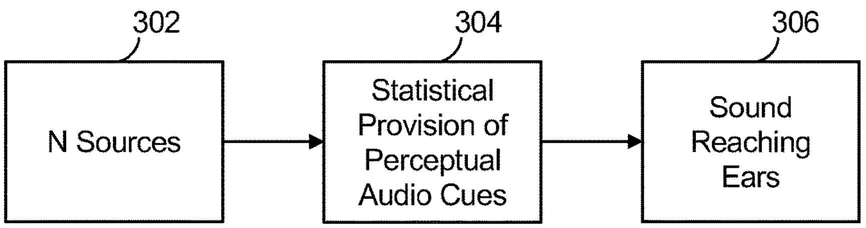
FIGS. 3A and 3B illustrates altering audio signals reaching a user's ears, e.g., during artificial reality experiences, in accordance with one or more implementations.
Figure 3B:
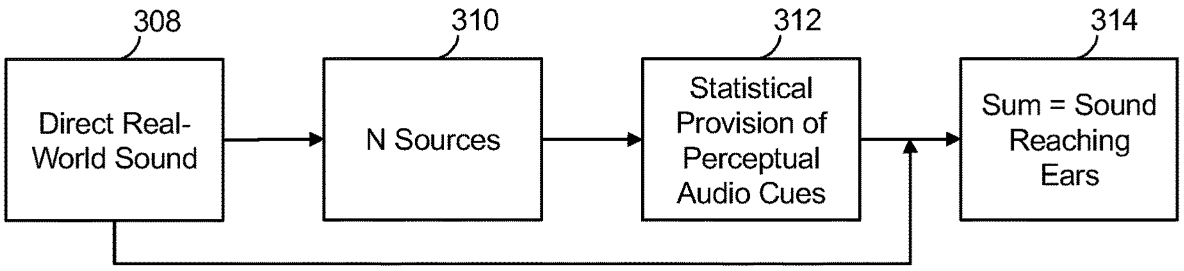

FIGS. 3A and 3B illustrates altering audio signals reaching a user's cars, e.g., during artificial reality experiences, in accordance with one or more implementations. FIG. 3A illustrates a virtual reality experience in which there are N sources 302 in a virtual reality environment. Perceptual audio cues 304 are statistically provisioned in real time such that the combined sound 306 reaching the user's cars includes sound from the N sources 302, but with sound from a target source being enhanced by the perceptual audio cues 304. FIG. 3B illustrates an augmented reality experience in which there is direct real-world sound sources 308 and N sources 310 (e.g., may be pre-segregated) associated with the augmented reality experience. These sounds are used to create perceptual audio cues 312, which are statistically provisioned in real time. The combined sound 314 reaching the user's ears includes sounds from the real-world sound sources 308 and the pre-segregated sources 310 associated with the augmented reality experience, but with sound from a target source being enhanced by the perceptual audio cues 312.

Figure 4:
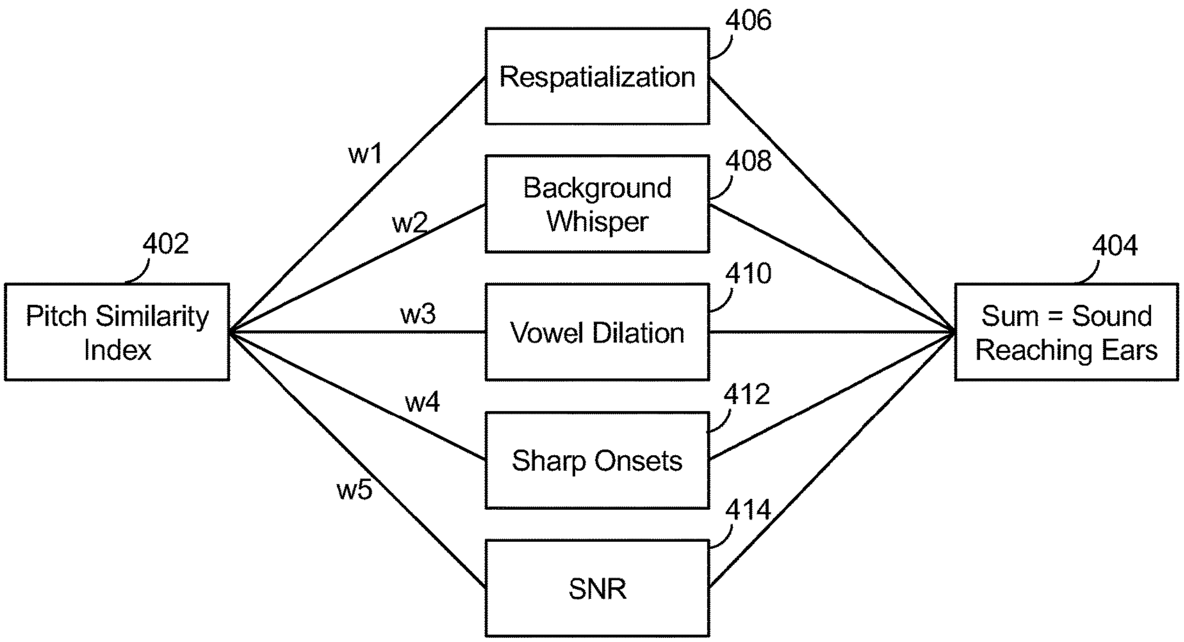
FIG. 4 illustrates weighting of perceptual cues, in accordance with one or more implementations.

FIG. 4 illustrates weighting of perceptual cues, in accordance with one or more implementations. Exemplary implementations may increase contrast between target and background sound by adjusting one or more perceptual cues. In FIG. 4, weightings (e.g., w1, w2, w3, . . . , wn) between a pitch similarity index 402 and different perceptual cues may affect how sound 404 is summed when reaching the user's cars. Examples of perceptual cues may include one or more of respatialization 406, whispered background 408, time-dilated vowels 410, enhanced sound onsets 412, and/or other perceptual cues. The perceptual cues may be independent of one another. In some implementations, signal-to-noise (SNR) 414 may be factored among the perceptual cues in determining sound 404 reaching the user's cars. Estimated pitch similarity between competing sources may inform both magnitude and balance of adjustment.

The pitch similarity index 402 may be determined for each k of N sources, in real time. This may include applying a band-pass filter to $source_k$ between 200 Hertz (Hz) and 2500 Hz. A length of analysis time window may be between 40 milliseconds (ms) and 200 ms. In some implementations, a step size may be between an inverse of sampling frequency and the length of analysis time window. A load last analysis time window of $source_k$ may be added to a first short-term buffer. A load previous analysis time window time-shifted by the step size of $source_k$ may be added to a second short-term buffer. The $pitch_k$ may be calculated as an inverse of a lag time of a peak of root-mean-square-normalized cross-correlation of the first and second short-term buffers. The difference between $pitch_k$ may determine how to balance respatialization 406, whispered background 408, time-dilated vowels 410, enhanced sound onsets 412, and/or other perceptual cues.

Figure 5:
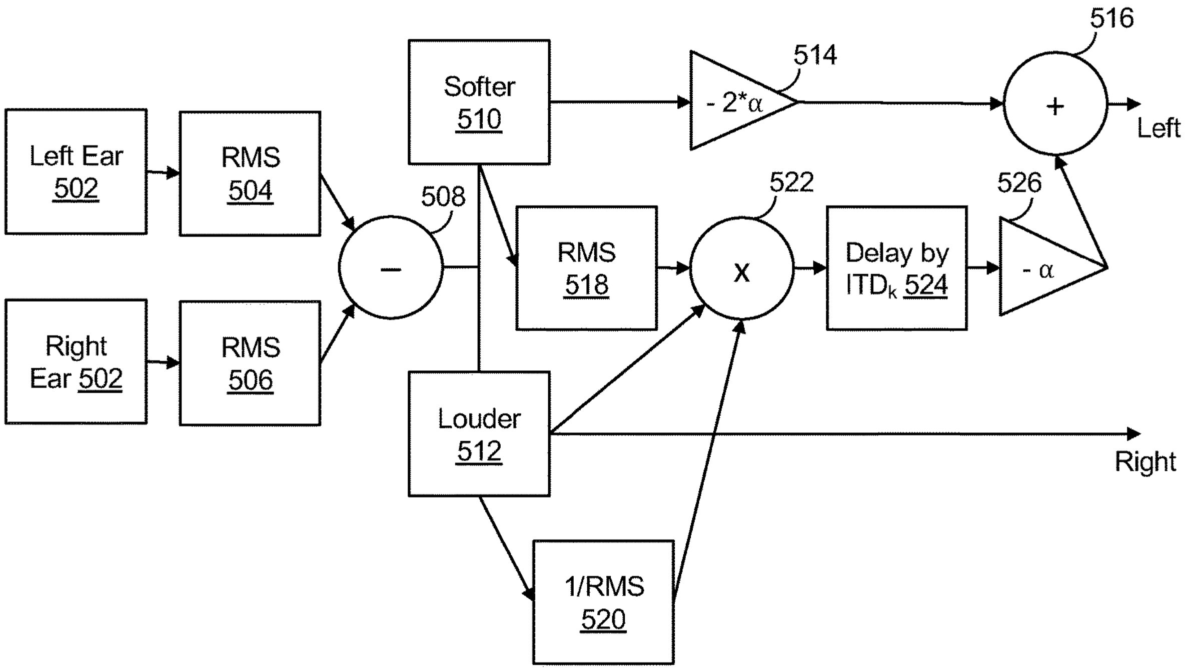
FIG. 5 illustrates speech enhancement through respatialization for statistic provisioning of perceptual audio cues, in accordance with one or more implementations.

FIG. 5 illustrates speech enhancement through respatialization 406 for statistic provisioning of perceptual audio cues, in accordance with one or more implementations. In determining respatialization 406, alpha may be defined as an attenuation level, roughly between 0 decibels (dB) and 20 dB. ILD may refer to an interaural level difference (e.g., negative ILD means that the left car is softer than the right car). ITD may refer to an interaural time difference (e.g., negative ITD means that sound reaches the left ear before the right car). $DR_{ITD}$ may refer to a dynamic range of respatialization ITDs, centered around 0, roughly between 300 microseconds (μs) and 300 μs, according to some implementations. $DR_{ITD}$ may be divided into k linearly spaced respatialized ITDs (e.g., for 5 sources: −300 μs, −150 μs, 0 μs, 150 μs, and 300 μs).

In virtual reality, for each k of N sources, exemplary implementations may determine, in real time, left-to-right spatial arrangement of sources (e.g., based on the user's visual screen layout). In augmented reality, for each k of N sources, exemplary implementations may, in real time, using the $source_k$ energy reaching the cars, for each car (see 502 in FIG. 5), apply a high-pass filter to $source_k$ above 3000 Hz $ILD_k$, which may be equivalent to a root-mean square of the left ear ($RMS_{Left}$) (see 504) minus $RMS_{Right}$ (see 506, 508). Sources may be sorted from left to right using $ILD_k$ (see 510, 512), which may include assigning $ITD_k$ from left to right. A length of analysis time window may be between 40 ms and 100 ms. A step size may be between an inverse of a sampling frequency and the length of analysis time window. $ILD_k$ may be calculated as $RMS_{Left}$ minus $RMS_{Right}$. Softer sources may be filtered (see 514) prior to being summed at the left ear (see 516). $RMS_{Softer\ Sources}$ (see 518) may be combined with louder sources (see 512) and an inverse of $RMS_{Softer\ Sources}$ (see 520, 522). The combination may be delayed by ITDk (see 524) and filtered (see 526) before being summed at the left ear (see 516). Louder sources (see 512) may be heard directly by the right car.

Determining whispered background 408 may involve, for each k of N−1 background sources, in real time, vocoding a band-pass filter with $source_k$ into contiguous narrow bands. In each narrow band, narrow band envelopes may be extracted by rectifying and applying a low-pass filter at 800 Hz. The envelope may be multiplied with noise. The narrow bands may be added. Whispered kth source may be determined as m times an original kth source plus (1-m) times a vocoded kth source, where m is an adjustable weight that controls pitchiness.

In determining time-dilated vowels 410, time dilation may be defined as roughly 10%. For a target source, in real time, vowels may be dilated using a vowel-dilation algorithm.

With enhanced sound onsets 412, a threshold intensity may be defined at roughly 20 dB SPL (i.e., the measured pressure relative to 20 micropascals). For each k of N sources, in real time, a source may be rectified by setting to zero those source segments that have below the threshold intensity. When gaps of more than 10 ms occur, individual gaps may be widened by a few samples to increase steepness of onset slope of subsequent sound.

The disclosed system(s) address a problem in traditional spatial audio generation techniques tied to computer technology, namely, the technical problem of allowing target sources in artificial reality environments to be heard clearly and without fatigue where there are multiple sound sources. The disclosed system solves this technical problem by providing a solution also rooted in computer technology, namely, by providing for statistical provisioning of perceptual audio cues to enhance speech. The disclosed subject technology further provides improvements to the functioning of the computer itself because it improves processing and efficiency in generating spatial audio.

Figure 6:
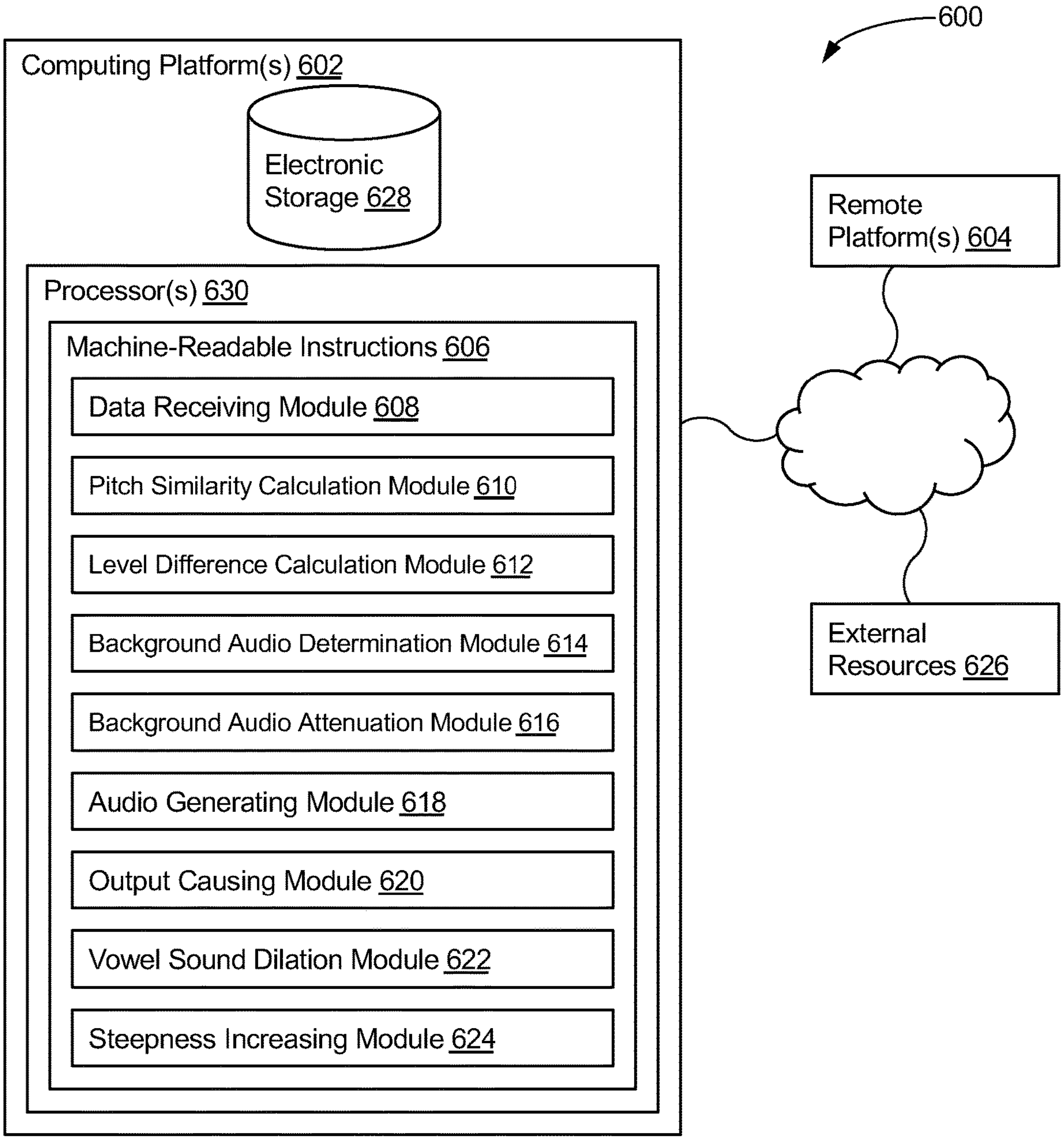
FIG. 6 illustrates a system configured for generating spatial audio, in accordance with one or more implementations.

FIG. 6 illustrates a system 600 configured for generating spatial audio, according to certain aspects of the disclosure. In some implementations, system 600 may include one or more computing platforms 602. Computing platform(s) 602 may be configured to communicate with one or more remote platforms 604 according to a client/server architecture, a peer-to-peer architecture, and/or other architectures. Remote platform(s) 604 may be configured to communicate with other remote platforms via computing platform(s) 602 and/or according to a client/server architecture, a peer-to-peer architecture, and/or other architectures. Users may access system 600 via remote platform(s) 604.

Computing platform(s) 602 may be configured by machine-readable instructions 606. Machine-readable instructions 606 may include one or more instruction modules. The instruction modules may include computer program modules. The instruction modules may include one or more of data receiving module 608, pitch similarity calculation module 610, level difference calculation module 612, background audio determination module 614, background audio attenuation module 616, audio generating module 618, output causing module 620, vowel sound dilation module 622, steepness increasing module 624, and/or other instruction modules.

Data receiving module 608 may be configured to receive audio data from a plurality of sources. The audio data may include a representation of sound recorded in digital form. The audio data may be received through microphones of users' head-mounted displays configured for artificial reality experiences. The audio data may be artificial and computer-generated. The plurality of sources may include representations of different entities within an artificial reality environment. The representations of different entities may include users' avatars within the artificial reality environment.

Pitch similarity calculation module 610 may be configured to, for each source of the plurality of sources, calculate a pitch similarity for the audio data. The pitch similarity may include an estimated pitch similarity between competing sources. The pitch similarity may inform one or both magnitude and/or balance of adjustment. Calculating the pitch similarity for the audio data may include taking an inverse of a lag time of a peak of a root-mean-square-normalized cross-correlation of two short-term buffers. One of the buffers may be time-shifted by a step-size. The step-size may be between an inverse of a sampling frequency and a length of an analysis time window. Determining the pitch similarity may include filtering the audio data between 200 Hz and 2500 Hz.

Level difference calculation module 612 may be configured to, for each source of the plurality of sources, calculate an interaural level difference based at least in part on an attenuation level and/or a dynamic range of interaural time differences of the audio data. The interaural level difference may include a difference in loudness and/or frequency distribution between the two ears of a user. Calculating the interaural level difference may include determining a relative difference between audio signals impinging on the user's right car and on the users left ear. Calculating the attenuation level of the interaural level differences may include determining a loss in signal strength of a relative difference between audio signals impinging on the user's right car and on the users left car. Calculating the dynamic range of the interaural level differences of the audio data may include determining a ratio between a smallest and largest quantities of a relative difference in energy between audio signals impinging on the user's right car and on the users left ear.

In some implementations, the interaural time difference may include a difference in arrival time of an audio signal between the two cars of a user. Calculating the interaural time differences may include determining a relative difference between arrival times of an audio signal at the user's right car and at the users left car. Calculating the attenuation level of the interaural time differences may include determining a loss in signal strength of the relative difference between the arrival times of the audio signal at the user's right car and at the users left car. Calculating the dynamic range of the interaural time differences of the audio data may include determining a ratio between a smallest and largest quantities of the relative difference between the arrival times of the audio signal at the user's right car and at the users left car.

Background audio determination module 614 may be configured to, for each source of the plurality of sources, determine background audio from the audio data. The background audio may include audio that is not the target source. The background audio may include non-target sources that are potential future target sources. The background audio may include audio from an artificial reality environment that can be perceived in a vicinity of a user's avatar. Determining the background audio from the audio data may include isolating and removing target source audio from the audio data. The target source audio may be sound emanating from the target source.

Background audio attenuation module 616 may be configured to, for each source of the plurality of sources, attenuate the background audio of the audio data. Attenuating the background audio of the audio data may include decreasing a signal strength of the background audio. The attenuating may include filtering the background audio into contiguous narrow bands. In some implementations, the attenuated background audio may include whispered audio.

Audio generating module 618 may be configured to generate spatial audio based at least in part on the audio data and the background audio. The spatial audio may include virtual placement of sound sources anywhere in a three-dimensional space of an artificial reality environment. Generating the spatial audio may include manipulating a sound produced by speakers or earphones of a head-mounted display configured for artificial reality experiences. Generating the spatial audio may include using one or both of head-related transfer functions and/or reverberation. Head-related transfer functions may include a response characterizing how an car receives a sound from a point in space. Reverberation may include a persistence of sound or echo after a sound is produced.

Output causing module 620 may be configured to cause output of the audio data and the background audio through an audio source. The audio source through which the output may be caused may include a head-mounted display device configured for artificial reality experiences.

Vowel sound dilation module 622 may be configured to dilate vowel sounds through time dilation. The vowel sounds may include syllabic speech sounds pronounced without stricture in the vocal tract of a human speaker. By way of non-limiting example, the time dilation may include stretching an audio signal in time without changing one or more of a pitch, a frequency, and/or a level of the audio signal. Dilating vowel sounds through time dilation may include synchronized overlap-add resynthesis. In some implementations, a time dilation ratio may be around 10%. In some implementations, the time dilation ratio may include a ratio between an original duration of an audio signal and a duration of a time-dilated version of the audio signal.

Steepness increasing module 624 may be configured to, for each source of the plurality of sources, increase a steepness of an onset slope of subsequent sound by widening a gap between sound samples of the audio data. The onset slope may include a beginning of an increase in signal strength in the audio data. Increasing the steepness of the onset slope may include narrowing a width of sound samples in the audio data.

In some implementations, computing platform(s) 602, remote platform(s) 604, and/or external resources 626 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 602, remote platform(s) 604, and/or external resources 626 may be operatively linked via some other communication media.

A given remote platform 604 may include one or more processors configured to execute computer program modules. The computer program modules may be configured to enable an expert or user associated with the given remote platform 604 to interface with system 600 and/or external resources 626, and/or provide other functionality attributed herein to remote platform(s) 604. By way of non-limiting example, a given remote platform 604 and/or a given computing platform 602 may include one or more of a server, a desktop computer, a laptop computer, a handheld computer, a tablet computing platform, a NetBook, a Smartphone, a gaming console, and/or other computing platforms.

External resources 626 may include sources of information outside of system 600, external entities participating with system 600, and/or other resources. In some implementations, some or all of the functionality attributed herein to external resources 626 may be provided by resources included in system 600.

Computing platform(s) 602 may include electronic storage 628, one or more processors 630, and/or other components. Computing platform(s) 602 may include communication lines, or ports to enable the exchange of information with a network and/or other computing platforms. Illustration of computing platform(s) 602 in FIG. 6 is not intended to be limiting. Computing platform(s) 602 may include a plurality of hardware, software, and/or firmware components operating together to provide the functionality attributed herein to computing platform(s) 602. For example, computing platform(s) 602 may be implemented by a cloud of computing platforms operating together as computing platform(s) 602.

Electronic storage 628 may comprise non-transitory storage media that electronically stores information. The electronic storage media of electronic storage 628 may include one or both of system storage that is provided integrally (i.e., substantially non-removable) with computing platform(s) 602 and/or removable storage that is removably connectable to computing platform(s) 602 via, for example, a port (e.g., a USB port, a firewire port, etc.) or a drive (e.g., a disk drive, etc.). Electronic storage 628 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 628 may include one or more virtual storage resources (e.g., cloud storage, a virtual private network, and/or other virtual storage resources). Electronic storage 628 may store software algorithms, information determined by processor(s) 630, information received from computing platform(s) 602, information received from remote platform(s) 604, and/or other information that enables computing platform(s) 602 to function as described herein.

Processor(s) 630 may be configured to provide information processing capabilities in computing platform(s) 602.

As such, processor(s) 630 may include one or more of a digital processor, an analog processor, a digital circuit designed to process information, an analog circuit designed to process information, a state machine, and/or other mechanisms for electronically processing information. Although processor(s) 630 is shown in FIG. 6 as a single entity, this is for illustrative purposes only. In some implementations, processor(s) 630 may include a plurality of processing units. These processing units may be physically located within the same device, or processor(s) 630 may represent processing functionality of a plurality of devices operating in coordination. Processor(s) 630 may be configured to execute modules 608, 610, 612, 614, 616, 618, 620, 622, and/or 624, and/or other modules. Processor(s) 630 may be configured to execute modules 608, 610, 612, 614, 616, 618, 620, 622, and/or 624, and/or other modules by software; hardware; firmware; some combination of software, hardware, and/or firmware; and/or other mechanisms for configuring processing capabilities on processor(s) 630. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 608, 610, 612, 614, 616, 618, 620, 622, and/or 624 are illustrated in FIG. 6 as being implemented within a single processing unit, in implementations in which processor(s) 630 includes multiple processing units, one or more of modules 608, 610, 612, 614, 616, 618, 620, 622, and/or 624 may be implemented remotely from the other modules. The description of the functionality provided by the different modules 608, 610, 612, 614, 616, 618, 620, 622, and/or 624 described below is for illustrative purposes, and is not intended to be limiting, as any of modules 608, 610, 612, 614, 616, 618, 620, 622, and/or 624 may provide more or less functionality than is described. For example, one or more of modules 608, 610, 612, 614, 616, 618, 620, 622, and/or 624 may be eliminated, and some or all of its functionality may be provided by other ones of modules 608, 610, 612, 614, 616, 618, 620, 622, and/or 624. As another example, processor(s) 630 may be configured to execute one or more additional modules that may perform some or all of the functionality attributed below to one of modules 608, 610, 612, 614, 616, 618, 620, 622, and/or 624.

In particular embodiments, one or more objects (e.g., content or other types of objects) of a computing system may be associated with one or more privacy settings. The one or more objects may be stored on or otherwise associated with any suitable computing system or application, such as, for example, a social-networking system, a client system, a third-party system, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system or shared with other systems (e.g., a third-party system). Although this disclosure describes using particular privacy settings in a particular manner, this disclosure contemplates using any suitable privacy settings in any suitable manner.

In particular embodiments, privacy settings may be based on one or more nodes or edges of a social graph. A privacy setting may be specified for one or more edges or edge-types of the social graph, or with respect to one or more nodes, or node-types of the social graph. The privacy settings applied to a particular edge connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system. The object may be associated with a concept node connected to a user node of the first user by an edge. The first user may specify privacy settings that apply to a particular edge connecting to the concept node of the object, or may specify privacy settings that apply to all edges connecting to the concept node. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers may be authorization/privacy servers for enforcing privacy settings. In response to a request from a user (or other entity) for a particular object stored in a data store, the social-networking system may send a request to the data store for the object. The request may identify the user associated with the request and the object may be sent only to the user (or a client system of the user) if the authorization server determines that the user is authorized to access the object based on the privacy settings associated with the object. If the requesting user is not authorized to access the object, the authorization server may prevent the requested object from being retrieved from the data store or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system may access such information in order to provide a particular function or service to the first user, without the social-networking system having access to that information for any other purposes. Before accessing, storing, or using such objects or information, the social-networking system may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system.

In particular embodiments, a user may specify whether particular types of objects or information associated with the first user may be accessed, stored, or used by the social-networking system. As an example and not by way of limitation, the first user may specify that images sent by the first user through the social-networking system may not be stored by the social-networking system. As another example and not by way of limitation, a first user may specify that messages sent from the first user to a particular second user may not be stored by the social-networking system. As yet another example and not by way of limitation, a first user may specify that all objects sent via a particular application may be saved by the social-networking system.

In particular embodiments, privacy settings may allow a first user to specify whether particular objects or information associated with the first user may be accessed from particular client systems or third-party systems. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system may provide default privacy settings with respect to each device, system, or application, and/or the first user may be prompted to specify a particular privacy setting for each context. As an example and not by way of limitation, the first user may utilize a location-services feature of the social-networking system to provide recommendations for restaurants or other places in proximity to the user. The first user's default privacy settings may specify that the social-networking system may use location information provided from a client device of the first user to provide the location-based services, but that the social-networking system may not store the location information of the first user or provide it to any third-party system. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, the social-networking system may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system may send a reminder to the user to confirm his or her privacy settings every six months or after every ten photo posts. In particular embodiments, privacy settings may also allow users to control access to the objects or information on a per-request basis. As an example and not by way of limitation, the social-networking system may notify the user whenever a third-party system attempts to access information associated with the user, and require the user to provide verification that access should be allowed before proceeding.

The techniques described herein may be implemented as method(s) that are performed by physical computing device (s); as one or more non-transitory computer-readable storage media storing instructions which, when executed by computing device(s), cause performance of the method(s); or, as physical computing device(s) that are specially configured with a combination of hardware and software that causes performance of the method(s).

Figure 7:
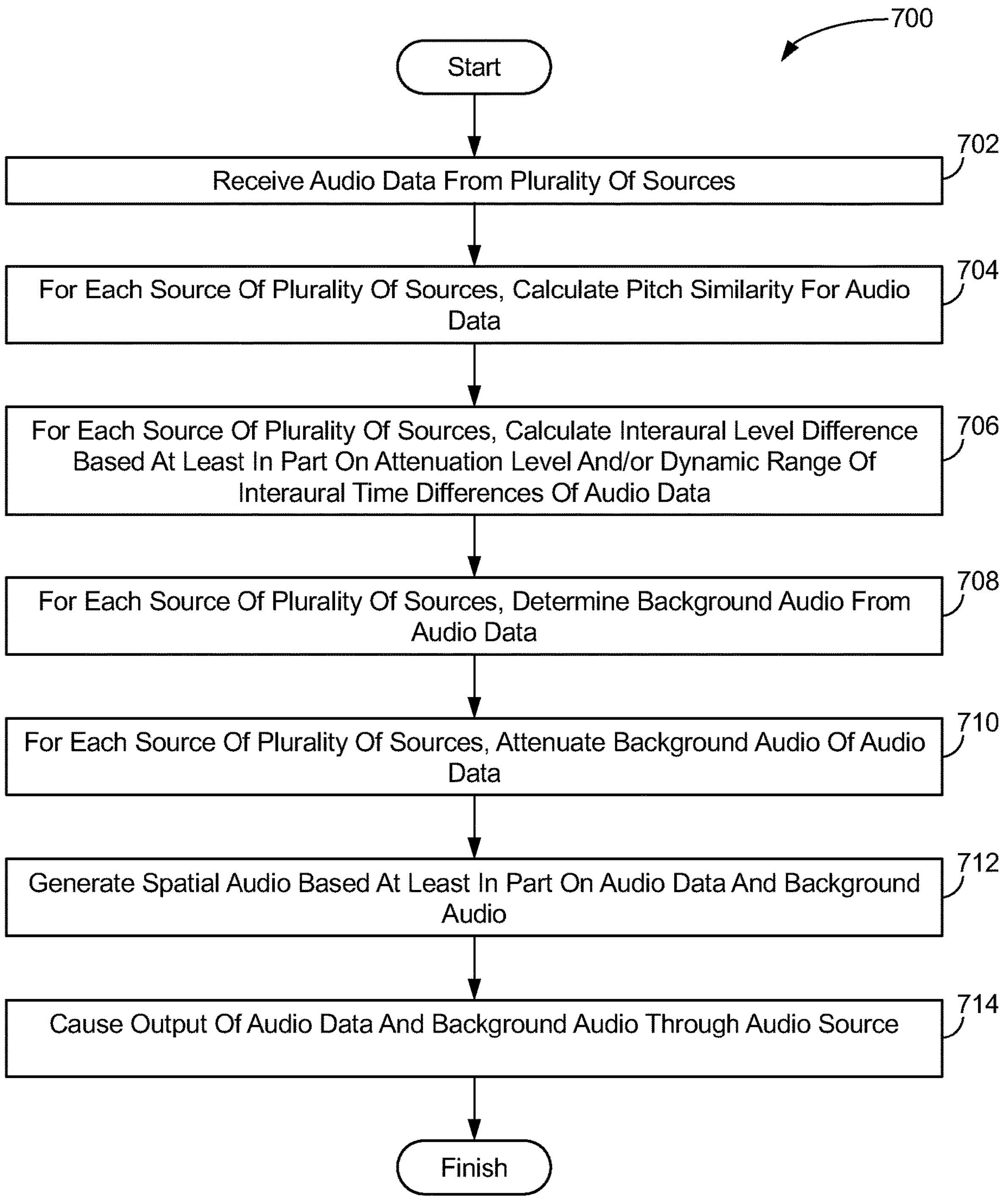
FIG. 7 illustrates an example flow diagram for generating spatial audio, according to certain aspects of the disclosure.

FIG. 7 illustrates an example flow diagram (e.g., process 700) for generating spatial audio, according to certain aspects of the disclosure. For explanatory purposes, the example process 700 is described herein with reference to FIGS. 1-6. Further for explanatory purposes, the steps of the example process 700 are described herein as occurring in serial, or linearly. However, multiple instances of the example process 700 may occur in parallel. For purposes of explanation of the subject technology, the process 700 will be discussed in reference to FIGS. 1-6.

At step 702, the process 700 may include receiving audio data from a plurality of sources. At step 704, the process 700 may include for each source of the plurality of sources, calculating a pitch similarity for the audio data. At step 706, the process 700 may include for each source of the plurality of sources, calculating an interaural level difference based at least in part on an attenuation level and/or a dynamic range of interaural time differences of the audio data. At step 708, the process 700 may include for each source of the plurality of sources, determining background audio from the audio data. At step 710, the process 700 may include for each source of the plurality of sources, attenuating the background audio of the audio data. At step 712, the process 700 may include generating spatial audio based at least in part on the audio data and the background audio. At step 714, the process 700 may include causing output of the audio data and the background audio through an audio source.

For example, as described above in relation to FIGS. 1-6, at step 702, the process 700 may include receiving audio data from a plurality of sources, through data receiving module 608. At step 704, the process 700 may include for each source of the plurality of sources, calculating a pitch similarity for the audio data, through pitch similarity calculation module 610. At step 706, the process 700 may include for each source of the plurality of sources, calculating an interaural level difference based at least in part on an attenuation level and/or a dynamic range of interaural time differences of the audio data, through level difference calculation module 612. At step 708, the process 700 may include for each source of the plurality of sources, determining background audio from the audio data, through background audio determination module 614. At step 710, the process 700 may include for each source of the plurality of sources, attenuating the background audio of the audio data, through background audio attenuation module 616. At step 712, the process 700 may include generating spatial audio based at least in part on the audio data and the background audio, through audio generating module 618. At step 714, the process 700 may include causing output of the audio data and the background audio through an audio source, through output causing module 620.

According to an aspect, the determining the pitch similarity comprises filtering the audio data between 200 Hz and 2500 Hz.

According to an aspect, the attenuating comprises filtering the background audio into contiguous narrow bands.

According to an aspect, the attenuated background audio comprises whispered audio.

According to an aspect, the process 700 further includes dilating vowel sounds through time dilation.

According to an aspect, a time dilation ratio is around 10%.

According to an aspect, the process 700 further includes, for each source of the plurality of sources, increasing a steepness of an onset slope of subsequent sound by widening a gap between sound samples of the audio data.

Figure 8:
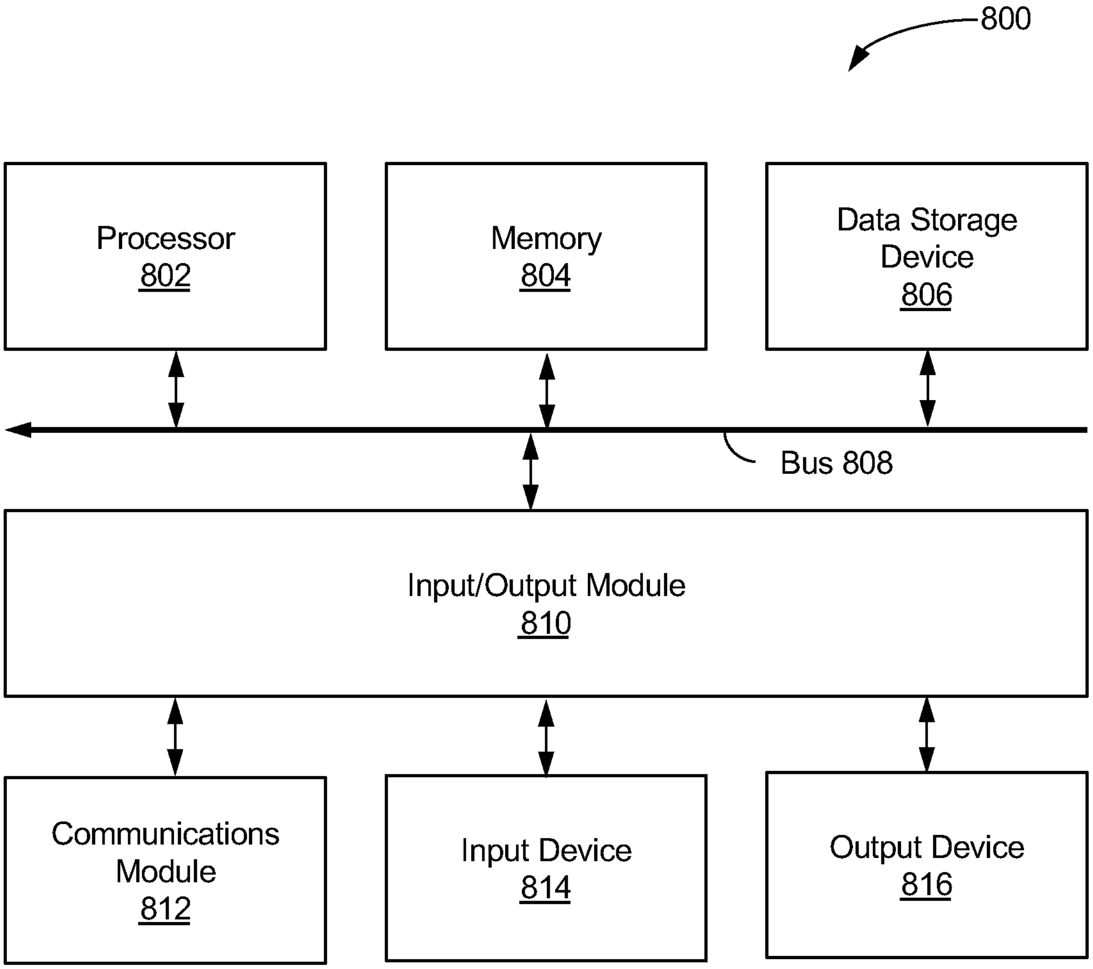
FIG. 8 is a block diagram illustrating an example computer system (e.g., representing both client and server) with which aspects of the subject technology can be implemented.

FIG. 8 is a block diagram illustrating an exemplary computer system 800 with which aspects of the subject technology can be implemented. In certain aspects, the computer system 800 may be implemented using hardware or a combination of software and hardware, either in a dedicated server, integrated into another entity, or distributed across multiple entities.

Computer system 800 (e.g., server and/or client) includes a bus 808 or other communication mechanism for communicating information, and a processor 802 coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer-readable medium for execution by, or to control the operation of, the computer system 800, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Exemplary input/output modules 810 include data ports such as USB ports. The input/output module 810 is configured to connect to a communications module 812. Exemplary communications modules 812 include networking interface cards, such as Ethernet cards and modems. In certain aspects, the input/output module 810 is configured to connect to a plurality of devices, such as an input device 814 and/or an output device 816. Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 816 include display devices such as an LCD (liquid crystal display) monitor, for displaying information to the user.

According to one aspect of the present disclosure, the above-described gaming systems can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in the main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 800 reads game data and provides a game, information may be read from the game data and stored in a memory device, such as the memory 804. Additionally, data from the memory 804 servers accessed via a network the bus 808, or the data storage 806 may be read and loaded into the memory 804. Although data is described as being found in the memory 804, it will be understood that data does not have to be stored in the memory 804 and may be stored in other memory accessible to the processor 802 or distributed among several media, such as the data storage 806.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

The invention claimed is:

1. A computer-implemented method for generating spatial audio, comprising:

receiving audio data from a plurality of sources;

for each source of the plurality of sources:

calculating a pitch similarity for the audio data, the pitch similarity determined in real time to dynamically adjust perceptual audio cues, wherein the perceptual audio cues comprise one or more of whispered backgrounds, time-dilated vowels, and enhanced sound onsets; and calculating an interaural level difference based at least in part on at least one of an attenuation level or a dynamic range of interaural time differences of the audio data;

generating spatial audio based at least in part on at least one of the pitch similarity of the audio data or the interaural level difference of the audio data; and causing output of audio, through one or more speakers, based at least in part on the generated spatial audio.

2. The method of claim 1, wherein calculating the pitch similarity comprises filtering the audio data between 200 Hz and 2500 Hz.

3. The method of claim 1, further comprising, for each source of the plurality of sources:

determining background audio from the audio data; and attenuating the background audio of the audio data, wherein the attenuating comprises filtering the background audio into contiguous narrow bands.

4. The method of claim 3, wherein the attenuated background audio comprises whispered audio.

5. The method of claim 1, wherein the time-dilated vowels are configured by dilating vowel sounds of the audio data through time dilation.

6. The method of claim 5, wherein a time dilation ratio is around 10%.

7. The method of claim 1, wherein the enhanced sound onsets are configured for each source of the plurality of sources by:

increasing a steepness of an onset slope of subsequent sound by widening a gap between sound samples of the audio data.

8. The method of claim 1, wherein the plurality of sources includes representations of different entities within an artificial reality environment.

9. The method of claim 1, wherein the audio data is received through microphones of users' head-mounted displays configured for artificial reality experiences.

10. The method of claim 1, wherein calculating the interaural level difference includes determining a relative difference between audio signals impinging on a right ear of a user and on a left ear of the user, and wherein calculating the interaural time differences includes determining a relative difference between arrival times of an audio signal at the right ear and the left ear of the user.

11. A system configured to generate spatial audio, the system comprising: one or more hardware processors configured by machine-readable instructions to:

receive audio data from a plurality of sources;

for each source of the plurality of sources:

calculate a pitch similarity for the audio data, the pitch similarity determined in real time to dynamically adjust perceptual audio cues, wherein the perceptual audio cues comprise one or more of whispered backgrounds, time-dilated vowels, and enhanced sound onsets; and calculate an interaural level difference based at least in part on an attenuation level or a dynamic range of interaural time differences of the audio data;

generate spatial audio based at least in part on at least one of the pitch similarity of the audio data or the interaural level difference of the audio data; and cause output of audio, through one or more speakers, based at least in part on the generated spatial audio.

12. The system of claim 11, wherein the one or more hardware processors are further configured by machine-readable instructions to, for each source of the plurality of sources:

determine background audio from the audio data; and attenuate the background audio of the audio data, wherein the attenuating comprises filtering the background audio into contiguous narrow bands.

13. The system of claim 12, wherein the attenuated background audio comprises whispered audio.

14. The system of claim 11, wherein calculating the pitch similarity comprises filtering the audio data between 200 Hz and 2500 Hz.

15. The system of claim 11, wherein the one or more hardware processors are further configured by machine-readable instructions to dilate vowel sounds of the audio data through time dilation to create the time-dilated vowels.

16. The system of claim 15, wherein a time dilation ratio is around 10%.

17. The system of claim 11, wherein the one or more hardware processors are further configured by machine-readable instructions to, for each source of the plurality of sources:

increase a steepness of an onset slope of subsequent sound by widening a gap between sound samples of the audio data to create the enhanced sound onsets.

18. The system of claim 11, wherein the plurality of sources includes representations of different entities within an artificial reality environment.

19. The system of claim 11, wherein the audio data is received through microphones of users' head-mounted displays configured for artificial reality experiences.

20. A non-transient computer-readable media storing instructions that, when executed by one or more processors, cause the one or more processors to perform operations comprising:

receiving audio data from a plurality sources;

for each source of the plurality of sources:

calculating a pitch similarity for the audio data, the pitch similarity determined in real time to dynamically adjust perceptual audio cues, wherein the perceptual audio cues comprise one or more of whispered backgrounds, time-dilated vowels, and enhanced sound onsets; and calculating an interaural level difference based at least in part on at least one of an attenuation level or a dynamic range of interaural time differences of the audio data;

generating spatial audio based at least in part on at least one of the pitch similarity of the audio data or the interaural level difference of the audio data; and causing output of audio, through one or more speakers, based at least in part on the generated spatial audio.

* * * * *